(12) United States Patent
Wei et al.

(10) Patent No.: US 6,483,666 B2
(45) Date of Patent: Nov. 19, 2002

(54) MAGNETIC MEDIA WITH TEXTURING FEATURES FORMED BY SELECTIVELY NON-UNIFORM LASER BEAMS

(75) Inventors: Bo Wei, Union, CA (US); Dallas W. Meyer, Burnsville, MN (US); Zhengda Pan, San Jose, CA (US); Jialuo J. Xuan, Milpitas, CA (US); Chung Y. Shih, Cupertino, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/799,840

(22) Filed: Mar. 6, 2001

(65) Prior Publication Data

US 2001/0028535 A1 Oct. 11, 2001

Related U.S. Application Data

(62) Division of application No. 08/849,001, filed on Aug. 13, 1999, now Pat. No. 6,225,595.
(60) Provisional application No. 60/017,267, filed on May 13, 1996, and provisional application No. 60/042,341, filed on Mar. 17, 1997.

(51) Int. Cl.$^7$ ................................................. G11B 5/82
(52) U.S. Cl. ....................................................... 360/135
(58) Field of Search .................................. 360/135, 133

(56) References Cited

U.S. PATENT DOCUMENTS 5,928,759 A * 7/1999 Arita ........................... 360/135

* cited by examiner

Primary Examiner—A. J. Heinz
(74) Attorney, Agent, or Firm—Larkin, Hoffman, Daly & Lindgren, Ltd.; Frederick W. Niebuhr, Esq.

(57) ABSTRACT

Magnetic data storage disks, particularly along dedicated transducing head contact regions, are laser textured according to a process in which beam shaping optical components impart an elliptical or otherwise elongated cross-section to the laser beam. Consequently, individual texturing features such as rims and nodules are elliptical or elongate, with more gradual height gradients in directions parallel to their major axes. The texturing features further are oriented with respect to the direction of transducing head accelerations and decelerations, which yields high performance in terms of reduced dynamic friction, reduced stiction and better wear characteristics. Texturing features are formed in a variety of patterns, including patterns with adjacent features contacting one another. A further refinement involves forming features with substantially different slopes on opposites sides of a maximum height region.

46 Claims, 6 Drawing Sheets

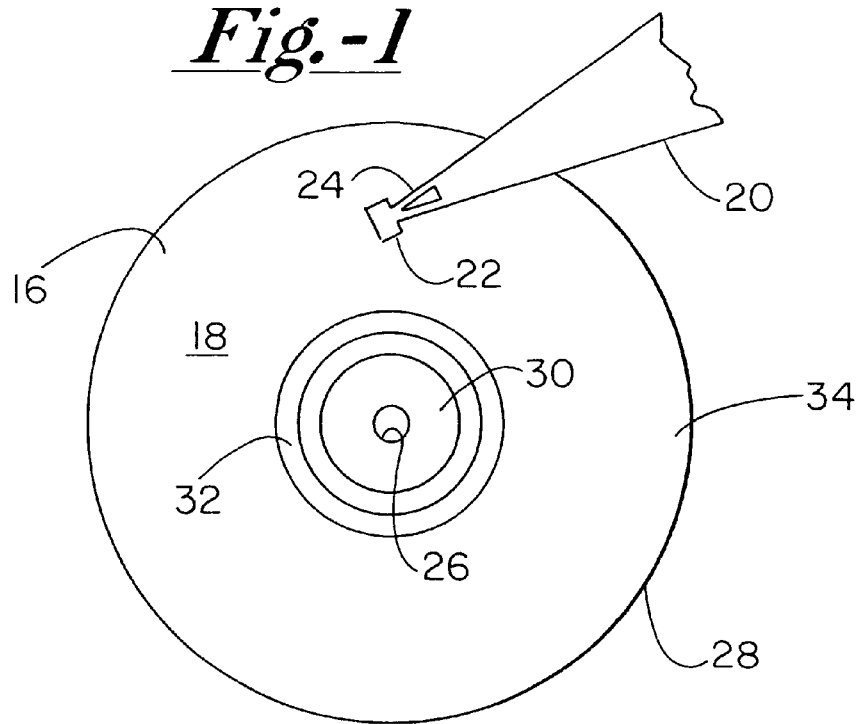
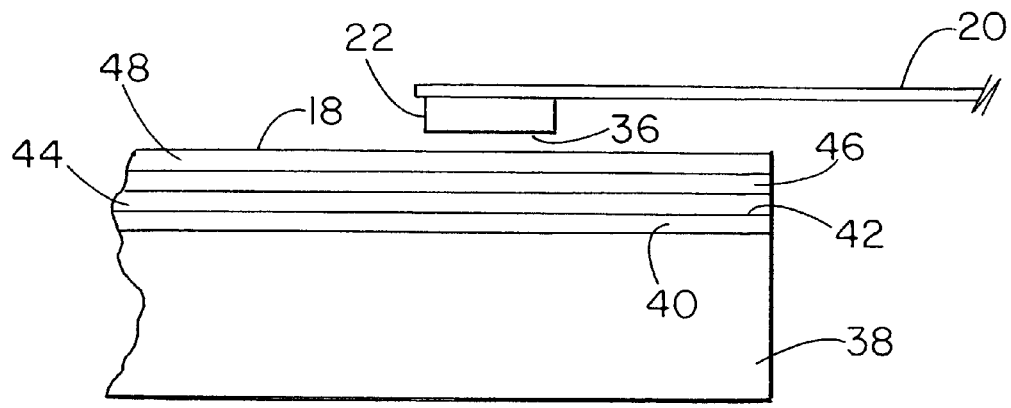

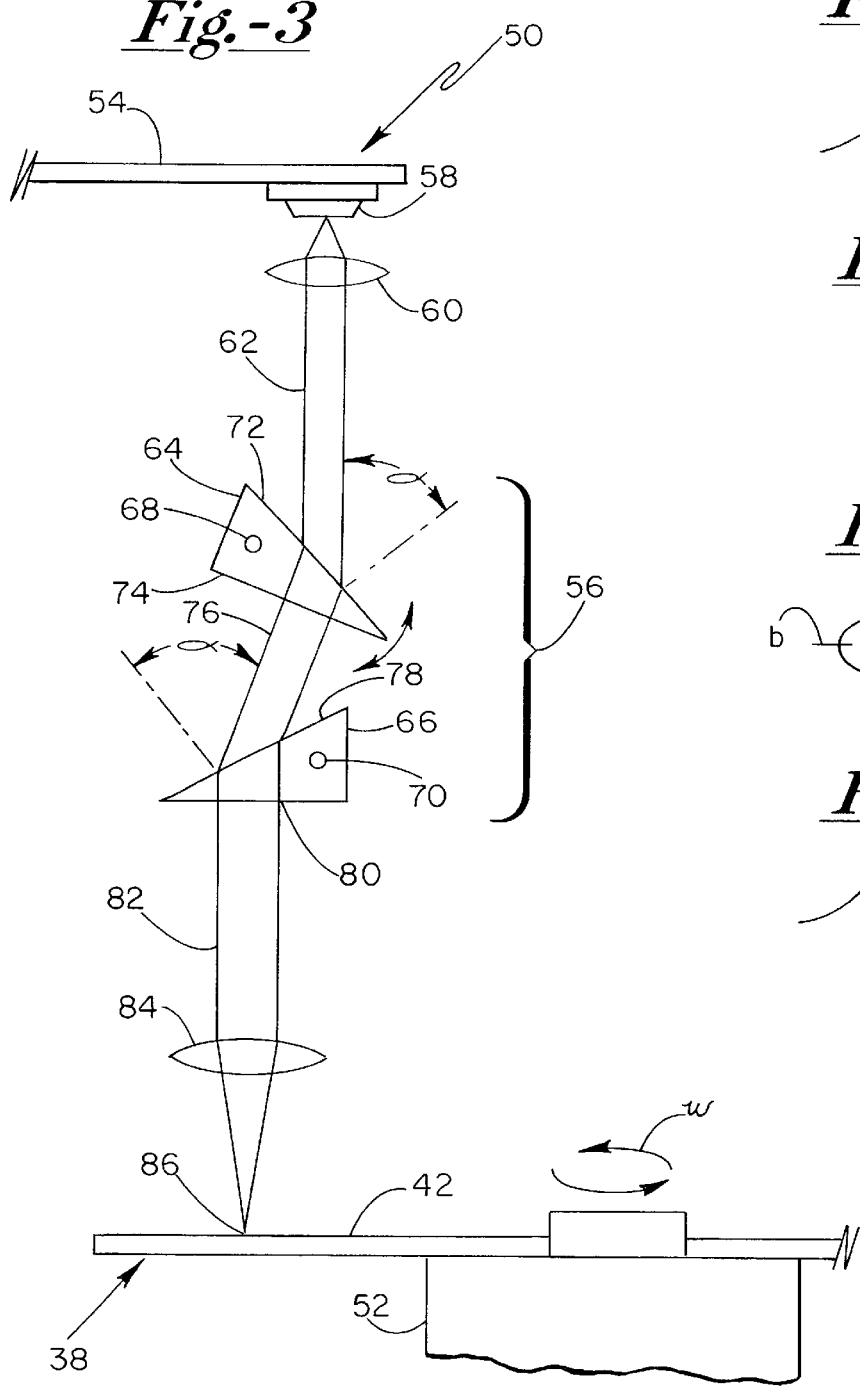
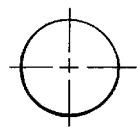
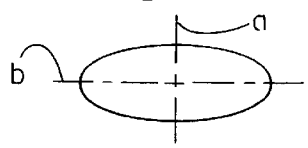

MAGNETIC MEDIA WITH TEXTURING FEATURES FORMED BY SELECTIVELY NON-UNIFORM LASER BEAMS

This is a divisional of copending prior application Ser. No. 08/849,001, filed Aug. 13, 1999, and now U.S. Pat. No. 6,225,595 issued on May 1, 2001.

This application claims the benefit of Provisional Application Ser. No. 60/017,267 entitled "Laser Texture Patterns Formed by Non-Axisymmetric Bumps for Magnetic Thin Film Disks", filed May 13, 1996; and Provisional Application Ser. No. 60/042,341, entitled "Using Wedged Prism to Control the Laser-Beam Sectional-Shape for Adjustable Elliptical Bump-Shapes in Laser Texturing Process of Magnetic Recording Media", filed Mar. 17, 1997.

BACKGROUND OF THE INVENTION

The present invention relates to laser texturing of magnetic data storage media and more particularly to processes for controlling the shapes and orientations of texturing features formed in such texturing processes, as well as the resulting storage media.

Laser texturing of magnetic disks, particularly over areas designated for contact with data transducing heads, is known to reduce friction and improve wear characteristics as compared to mechanically textured disks. Texturing involves focusing a laser beam onto a disk substrate surface at multiple locations, forming at each location a depression surrounded by a raised rim, as in U.S. Pat. No. 5,062,021 (Ranjan) and U.S. Pat. No. 5,108,781 (Ranjan). Alternatively, as shown in International Publication No. WO 97/07931 published Mar. 6, 1977 (Meyer), the laser beam also can be used to form a bump or nodule at each of the multiple locations. In some cases, a dome or bump is surrounded by a ring.

In any event, the individual topographical features are circular or axisymmetric, more particularly symmetrical about a vertical central axis in the case of features formed on a horizontal surface. While textures based on these features exhibit considerable improvement over mechanically formed textures, the ongoing quest for lower transducing head flying heights and shorter times for accessing data lead to more stringent tribological textures, the ongoing quest for lower transducing head flying heights and shorter times for accessing data lead to more stringent tribological requirements.

Meeting these requirements has been difficult in view of certain structural characteristics of the circular, axisymmetric rims and nodules. These features include a relatively small radius of curvature, a relatively large nodule height as compared to diameter, and large rim height compared to rim width. The resulting abrupt changes in surface elevation cause turbulence at the head/media interface. This results in undesirably high levels of acoustic energy at take-off and landing of the transducing head, i.e. at disk accelerations and decelerations. The closed, rim-like features have exhibited a tendency to collect debris, and their radial component can generate a drag force thought to contribute to dynamic friction.

Therefore, it is an object of the present invention to provide magnetic data storage media with transducer contact regions textured for improved wear and reduced dynamic friction.

Another object is to provide a process for using a laser to texture the surfaces of magnetic data storage media, with more control over the shape and orientation and texturing features formed by the laser to impart a desired roughness.

A further object is to provide a laser texturing process that affords more consistency in forming asymmetrical features such as rims and nodules on textured magnetic media.

Yet another object is to provide magnetic media in which the orientation of non-circular, non-axisymmetric topographical features is determined with reference to the direction of transducing head accelerations and decelerations, to increase the performance benefits derived from the asymmetries.

SUMMARY OF THE INVENTION

To achieve these and other objects, there is provided a process for surface texturing a magnetic data storage medium, including the following steps:

a. directing a coherent energy beam from a source thereof toward a magnetic data storage medium;

b. locating beam shaping optics between the source and the storage medium, thereby shaping the beam to provide a shaped beam segment along which sections taken through the beam perpendicular to beam propagation have a selected non-circular sectional shape; and c. causing the coherent energy beam to impinge upon a selected surface of the storage medium at a plurality of locations thereon, altering the topography of the selected surface at each of the locations by forming a non-circular texturing feature, while orienting the features with major axes thereof substantially aligned in a predetermined direction.

The features formed according to this process are of the same general types as previously mentioned forms, including nodules, bumps and rims, having a smooth, rounded or rotund character that leads to reduced friction and increased wear. In a departure from prior forms, features formed by the present process are non-circular or non-axisymmetric in the sense of being substantially elongated in a direction parallel to the major plane of the data storage medium. Thus, the nodules or bumps are oblong or oval, and the rims are elliptical rather than circular. In general, each feature has a major or "long" axis in the direction of elongation and a minor or short axis that is perpendicular to the major axis. The aspect ratio, i.e. the major axis/minor axis ratio, can be in the range of about 1.5 to about 10, and more preferably is in the range of about 4–6.

The formation of elongated features provides several advantages. One of these, specific to rim-like features is a reduced tendency to entrap material. The elongated, elliptical rims exhibit a height gradient in the direction of the major axis, from a maximum height along medial regions intersected by the minor axis, to minimal heights at opposite end regions intersected by the major axis. At sufficient elongation, the rim height at these end regions becomes negligible, forming interruptions or gaps in the otherwise elliptical rim. These gaps allow any material collected within the rim to escape, e.g. during storage medium accelerations and decelerations.

More generally, all forms of the elongated texturing features exhibit more favorable profiles when elongated. In particular, each nodule, rim or other feature has a height profile that varies, from a maximum height gradient or steepest profile in the vertical plane containing the minor axis, to a minimum height gradient or most gradual profile in the plane containing the major axis. Other planes yield intermediate gradients and profiles, with the maximum or minor-axis profile most like that of a similarly sized but axisymmetric feature.

Thus, a maximum benefit is realized when the elongated topographical features are correctly oriented, i.e. with their major axes to the extent possible aligned with the direction of transducing head travel relative to the storage medium during accelerations and decelerations. In disk-shaped storage media, this direction is circumferential with respect to the disks. As a result of this orientation, the transducing head, when moving on or over the dedicated contact region, encounters more gradual changes in height. This reduces turbulence at the head/medium interface, reduces dynamic friction, reduces stiction, and permits lower head flying heights. Wear characteristics are improved, because the elongated features, when properly oriented, more effectively withstand contact with the transducing head.

The beam shaping optics can take a variety of forms, the most simple being a single wedged prism, with a pair of cylindrical lenses being more suitable. The most preferred version of beam shaping optics comprises a pair of complementary wedged prisms. The wedged prisms are preferred due to their plane surface refraction of the coherent energy beam, which preserves beam collimation and propagation factor $M^2$ while minimizing aberrations and distortions. This enables a smaller focal spot size, suitable for forming smaller texturing features, while also enhancing control over the shape of the features.

Regardless of whether wedged prisms or cylindrical lenses are employed, using beam shaping optics to provide a specially shaped, non-circular (in section) laser beam affords effective control over the shape and orientation of elongated texturing features, and affords a high degree of flexibility in terms of selecting aspect ratios. This is in contrast to tilting the laser beam, a possibility mentioned in the foregoing Ranjan patents and Meyer international publication, for which an aspect ratio as low as 2 would require a severe tilt of 60 degrees from the preferred orientation perpendicular to the treated surface. The improved control and flexibility afforded by optically shaping the laser beam allow a customizing of texturing heretofore unavailable, not only in selecting the degree of elongation, but in the consistency with which features conform to the desired asymmetry.

IN THE DRAWINGS

For a further understanding of the above and other features and advantages, reference is made to the following detailed description and to the drawings, in which:

FIG. 1 is a plan view of a magnetic data storage disk and a data transducing head supported for generally radial movement relative to the disk;

FIG. 2 is an enlarged partial sectional view of the magnetic disk in FIG. 1;

FIG. 3 is an elevational view of a texturing device for forming texturing features on the disk;

FIGS. 4A–4D illustrate energy distributions and profiles of a cylindrical laser beam and a shaped laser beam, respectively;

DETAILED DESCRIPTION OF THE PREFERRED EMBODIMENTS

Figure 5:
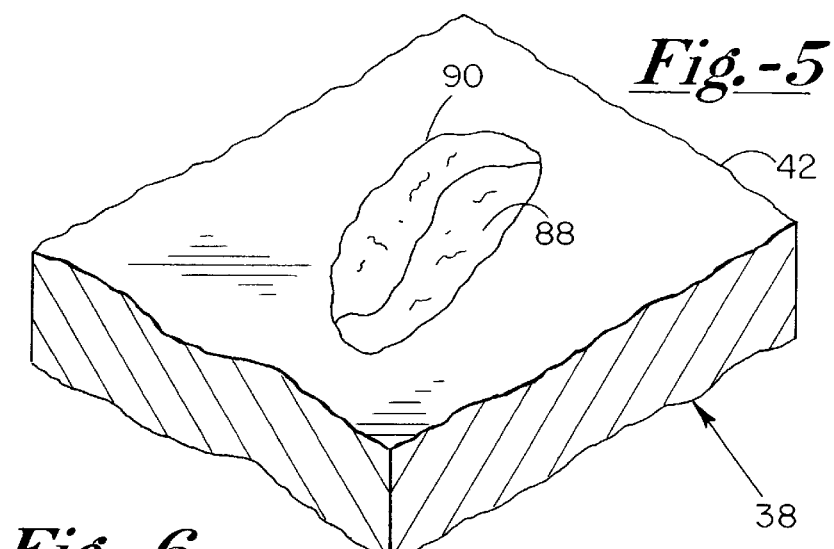
FIG. 5 is a perspective view of one of the texturing features, namely an elliptical rim.

Turning now to the drawings, there is shown in FIGS. 1 and 2 a medium for recording and reading magnetic data, in particular magnetic disk 16 rotatable about a vertical axis and having a substantially planar and horizontal upper surface 18. A rotary actuator (not shown) carries a transducing head support arm 20 in cantilevered fashion. A magnetic data transducing head 22 is mounted to the free end of the support arm, through a suspension 24 which allows gimballing action of the head, i.e. limited vertical travel and rotation about pitch and roll axes. The rotary actuator and the support arm pivot to move head 22 in an arcuate path, generally radially with respect to the disk.

At the center of disk 22 is an opening to accommodate a disk drive spindle 26 used to rotate the disk. Between the opening and an outer circumferential edge 28 of the disk, upper surface 18 is divided into three annular regions or zones: a radially inward region 30 used for clamping the disk to the spindle; a dedicated transducing head contact zone 32; and a data storage zone 34 that serves as the area for recording and reading the magnetic data.

When disk 16 is at rest, or rotating at a speed substantially below the normal operating range, head 22 contacts upper surface 18. When the disk rotates within the normal operating range, an air bearing or cushion is formed by air flowing between head 22 and upper surface 18 in the direction of disk rotation. The air bearing supports the head in parallel, spaced apart relation to the upper surface. Typically the distance between a planar bottom surface 36 of head 22 and upper surface 18, known as the head "flying height", is about 10 microinches (254 nm) or less. The flying height should be as low as practicable for maximum data storage density.

For data recording and reading operations, rotation of the disk and pivoting of the support arm are controlled in concert to selectively position transducing head 22 near desired locations within data zone 34. Following a reading or recording operation, the disk is decelerated and support arm 20 is moved radially inward toward contact zone 32. By the time disk 16 decelerates sufficiently to allow head 22 to engage the upper surface, the head is positioned over the contact zone. Thus, head contact with other regions of the disk surface is avoided. Before the next data operation, the disk is accelerated from stop, initially with head 22 engaged with disk 16 within the contact zone. Support arm 20 is not pivoted until the head is supported by an air bearing, free of the contact zone.

Magnetic disk 16 is formed first by polishing, grinding or otherwise mechanically finishing an aluminum substrate disk 38 to provide a substantially flat upper surface. Next, a nickel-phosphorous alloy is plated onto the upper surface of the substrate disk, to provide a non-magnetizable layer 40 with a uniform thickness within the range of about 2–10 microns. Following plating, the upper surface of the Ni—P alloy layer, i.e. a substrate surface 42, is polished to a roughness of generally less than about 0.1 microinch (2.54 nm). A saturated cloth, paper or pad coated or flooded with cerium oxide, silicon carbide or another suitable grit, is used for this purpose. A liquid slurry containing grit also may be used. Alternatively, aluminum substrate disks can be obtained with Ni—P alloy layers already applied, then polished as described.

After mechanical polishing, substrate disk 38 is laser textured at least within contact zone 32 to provide a desired surface roughness. Laser texturing involves melting the substrate disk at and near surface 42 at multiple locations, forming at each location a texturing feature, as will be described in greater detail below. The texture is influenced by the general pattern of texturing features, as well as the size and shape of the features individually.

Fabrication of disk 16 after texturing involves the application of several layers. Chrome is sputter deposited onto substrate surface 42, preferably to a thickness in the range of about 10–100 nm, to form an underlayer 44. The underlayer is well suited for subsequent deposition of a magnetic thin film, in that the crystalline structure of underlayer 44 can control the epitaxy of the crystalline magnetic film. The magnetic thin film provides a recording layer 46 for storing the magnetic data. The thin film material preferably is a cobalt/tantalum/chromium alloy or a cobalt/platinum/chromium alloy, and is sputter deposited to a thickness in the range of about 10–50 nm. Finally, a protective layer 48, typically carbon, is sputter deposited onto the recording layer to a thickness of about 5–30 nm. Underlayer 44, recording layer 46 and cover layer 48 are substantially uniform in thickness. Consequently, upper surface 18 substantially replicates the texture of substrate surface 42.

Laser texturing preferably is accomplished with a laser texturing device 50. As seen in FIG. 3, device 50 includes a spindle 52 for rotatably supporting substrate disk 38. Above disk 38, a carriage 54 supports a laser module 56 for reciprocal movement radially with respect to the disk. The laser module includes a naodymium: yetrium lithium fluoride (Nd:YLF) diode laser 58, and collimating optics 60 for collimating the diode laser output to produce a beam 62 in the form of a circular cylinder having a diameter of about 1 mm. With laser 58 preferably operated in the $TEM_{00}$ mode, the beam has a Gaussian energy distribution as indicated in FIG. 4A. Sections of the beam perpendicular to propagation, i.e. horizontal sections as viewed in FIG. 3, exhibit circular profiles as shown in FIG. 4B.

The laser module also includes several optical components for selectively shaping beam 62, to expand the beam in a first direction while leaving the beam substantially unchanged in another direction perpendicular to the first. These components include a pair of wedged prisms 64 and 66 spaced from one another along the beam path. The prisms are supported by adjustment components, schematically illustrated at 68 and 70 respectively, that permit azimuth angle adjustment of each prism about an axis perpendicular to the plane of the drawing. This permits adjustment of the angle of incidence α of the laser energy upon a planar receiving surface 72 of prism 64. Given the non-zero angle α and the alignment of an opposed planar exit surface 74 substantially perpendicular to the refracted beam, the beam emerges from prism 64 refracted and at an oblique angle relative to the incoming beam in a refracted, partially broadened beam segment 76. Beam segment 76 enters prism 66 through a planar receiving surface 78, refracted and thus angularly offset from the beam propagation direction, preferably by the same angle of incidence α, but in the opposite direction. An opposed exit surface 80 of prism 66 is substantially perpendicular to the refracted beam. As a result, the beam, having been twice refracted and twice enlarged in the same direction, emerges from prism 66 as a shaped beam segment 82. Sections of shaped beam segment 82 perpendicular to propagation have elliptical profiles as indicated in FIG. 4C. The circular profile in FIG. 4B illustrates the circular or axisymmetric nature of beam 62 upstream of the beam shaping optics. The beam diameter is constant, regardless of the angle at which it is taken. By contrast, the non-circular, non-axisymmetric shaped beam segment 82 exhibits the elliptical profile of FIG. 4C, with axes ranging from a minor axis "a" taken in the horizontal direction and normal to the plane of FIG. 3, to a major or long axis "b" taken in the horizontal direction parallel to the plane of FIG. 3. The energy distribution in beam segment 82 remains Gaussian, but like the beam itself is broadened in the direction parallel to the major axis, as shown in FIG. 4D.

Prisms 64 and 66 can be considered complementary in the sense that (1) they have the same size, shape and refractive index and thus refract incident coherent energy by the same amount or same angle; and (2) they are positioned to refract energy in opposite directions, so that shaped beam segment 82 is parallel to beam 62 upstream of the shaping components. This feature while not essential is advantageous because it most effectively preserves the beam collimation and propagation factor $M^2$. (The propagation factor $M^2$ describes the purity of the $TEM_{00}$ mode. For a perfect Gaussian beam, $M^2$ is equal to 1.)

Azimuth angles of prisms 64 and 66 can be adjusted through components 68 and 70 to change the angles of incidence α, and thus change the aspect ratio b/a of the shaped beam segment. Through this adjustment to the prisms it has been found practicable to increase the aspect ratio from 1 (circular profile) up to about 6. More particularly, the aspect ratio of shaped beam segment 82, due to the wedged prisms can be determined by the equation:

$$\frac{b_b}{a_b} = \frac{\cos[\arcsin(\sin\alpha/n)]}{\cos\alpha}$$

where α is the angle of incidence and n is the index of refraction (both prisms).

Beyond the beam shaping optics, a focusing lens 84 converges the beam and defines a focal spot or area 86 of beam impingement onto substrate surface 42. Focal spot 86 has the elliptical shape and aspect ratio of the beam section shown in FIG. 4C. The major and minor axes of the focal spot are determined by the following equations:

$$a_f = \frac{4fM^2\lambda}{\pi b_b} \quad (2)$$

$$b_f = \frac{4fM^2\lambda}{\pi a_b} \quad (3)$$

where $a_f$ and $b_f$ are the respective minor and major axes of the focal spot, f is the focal length, and λ is the beam wavelength. Thus, the shape of focal spot 86 is controlled by prisms 64 and 66 and more specifically their azimuth angles, while the size of the focal spot is controlled by focusing lens 84 in conjunction with the prisms, and of course in part by collimating optics 60.

As explained in the aforementioned U.S. Pat. No. 5,062,021, U.S. Pat. No. 5,108,781, and International Publication No. WO 97/07931, which documents are incorporated herein by reference, the focusing of laser energy onto the metallic surface of the substrate disk causes highly localized melting at the surface. Although the material resolidifies rapidly, there is sufficient material flow to form either a rim or a nodule, with higher energy levels tending to result in rims rather than nodules.

Figure 6:
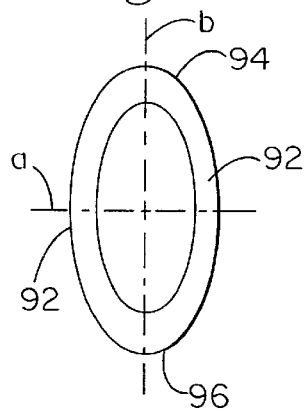
FIG. 6 is a top view showing an elliptical rim.
Figure 7:
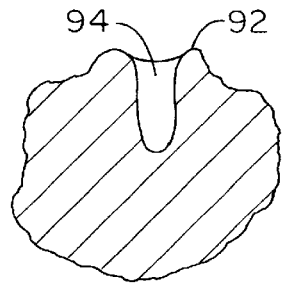
FIG. 7 is a sectional view taken along the vertical plane containing a minor axis of the rim.
Figure 8:
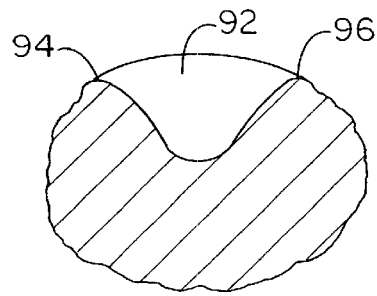
FIG. 8 is a sectional view taken along the vertical plane containing a major axis of the rim.

FIG. 5 shows in perspective a texturing feature formed using device 50, namely a rim 88. FIGS. 6–8 illustrate the rim profile from the top and from two vertical sections through the rim perpendicular to one another. As seen from these views, rim 88 is elongated or elliptical, having an aspect ratio b/a of greater than one. This aspect ratio is not necessarily proportional to the aspect ratio of the beam and focal spot. However, there is a correspondence, in that within practical limits, the aspect ratio of rim 88 tends to increase with increases in the beam and focal spot aspect ratio. Typically, rim lengths (major axis b) are within the range of about 50 to about 200 microns, with rim widths (minor axis a) in the range of about 15–50 microns. The rim aspect ratio should be at least about 1.5, and at most about 10. More preferably, the aspect ratio ranges from about 4 to about 6.

In FIG. 7, rim 88 and its adjacent portion of substrate disk 38 are shown in section along the vertical plane containing minor axis a. The profile in that plane is substantially the same as the profile resulting from a vertical plane taken through a circular or axisymmetric rim of the same height. A top edge 90 of the rim is curved, illustrating a key difference from circular rims in that the rim height is non-uniform.

The sectional view in FIG. 8 is along the vertical plane containing major axis b. As compared to FIG. 7, opposite portions of the rim are farther apart from one another, and the rim sections themselves have more gradual height gradients. Rim top edge 90 is highest along medial regions 92 of the rim, i.e. regions intersected by the minor axis. The rim top edge slopes downward in both directions toward opposite ends 94 and 96 of the rim, i.e. regions intersected by the major axis, where the rim height is at its minimum. Thus, in FIG. 8 as compared to FIG. 7, all features have more gradual inclines.

Figure 9:
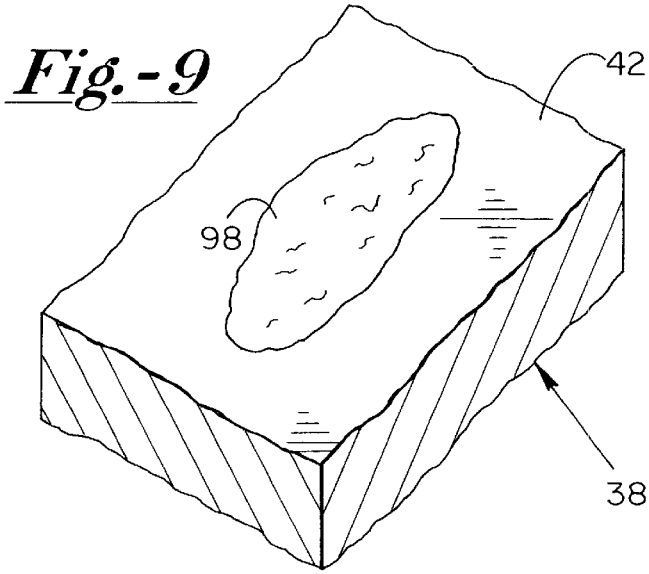
FIG. 9 is a perspective view showing an oblong nodule.
Figure 10:
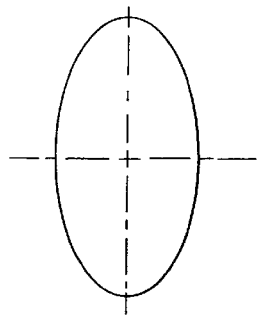
FIG. 10 is a top view of the elliptical nodule.
Figure 11:
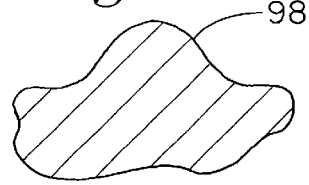
FIG. 11 is a sectional view taken along the vertical plane containing a minor axis of the nodule.
Figure 12:
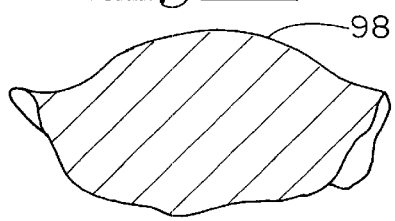
FIG. 12 is a sectional view taken along the vertical plane containing a major plane of the nodule.

A nodule or bump 98 formed by device 50 is shown in perspective in FIG. 9, with corresponding top, end sectional and side sectional views in FIGS. 10–12. Once again, the sectional views are based on vertical planes through the a and b axes with the profile in FIG. 11 comparable to a profile of a circular bump having the same height, and the profile view in FIG. 12 showing a substantially more gradual incline from a maximum height at the center of bump 98.

Maximum rim heights are typically in the range of 5–30 nm, while maximum nodule or bump heights typically are in the range of 5–30 nm.

Beyond controlling individual rims and nodules, device 50 is used to provide a desired pattern or distribution of the texturing features throughout contact zone 32. One suitable pattern is a spiral, formed by rotating substrate disk 38 on a vertical axis at an angular speed $\omega$ (FIG. 3) while at the same time moving the laser module radially with respect to the disk. The laser is pulsed to form individual texturing features, either rims or nodules, for example at a frequency in the range of 10,000–80,000 pulses per second. The substrate disk is rotated to provide a suitable linear velocity, for example about one meter per second. The disk moves continually during texturing, but for purposes of individual feature formation can be considered stationary due to the extremely short duration of each pulse, e.g. about 10 ns.

Figure 13:
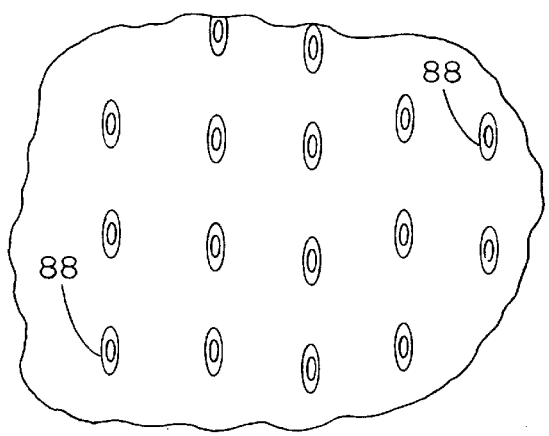
FIG. 13 is an enlarged partial top view of the disk showing a pattern of topographical features formed on the disk.

The resulting pattern of rims 88 can be seen in FIG. 13, showing a segment of contact zone 32. Each rim 88 is aligned with its minor axis "a" in the radial direction (with respect to the substrate disk), and with its major axis "b" in the circumferential direction. This alignment or orientation is specifically chosen with reference to the movement of head 22 and disk 16 relative to one another, particularly during accelerations and decelerations of the head. (While accelerations and decelerations actually are due to disk rotation, they are commonly discussed in terms of circular travel of the transducing head relative to the disk.) The orientation of rims 88 with their major axes in the circumferential direction has been found highly favorable, because it positions the most gradual rim height gradients in the direction of head travel. This reduces turbulence, reduces stiction and dynamic friction, and permits the head to have a lower flying height above the disk.

Figure 14:
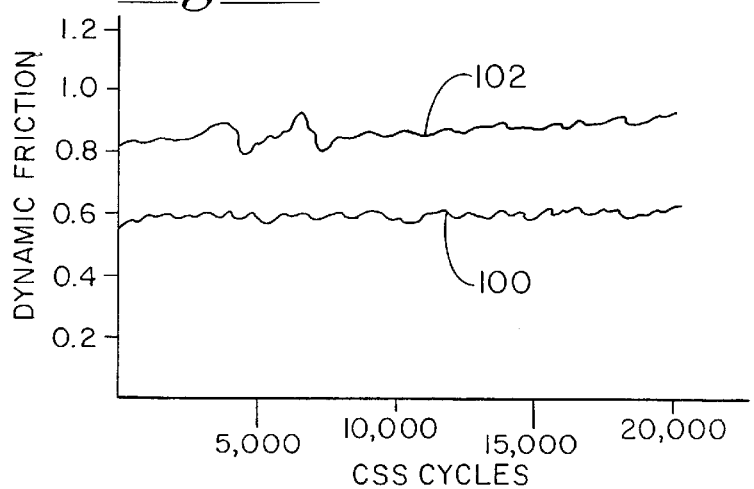
FIG. 14 is a chart illustrating comparative dynamic friction due to axisymmetric texturing features versus non-axisymmetric texturing features.

The chart in FIG. 14 shows the reduced dynamic friction. A plot 100 based on disk 16 shows a dynamic friction of approximately 0.6. A comparative plot 102, based on circular or axisymmetric texturing features, exhibits a substantially higher dynamic friction above 0.8 over most of the 20,000 ccs (controlled start stop) cycle range.

Figure 15:
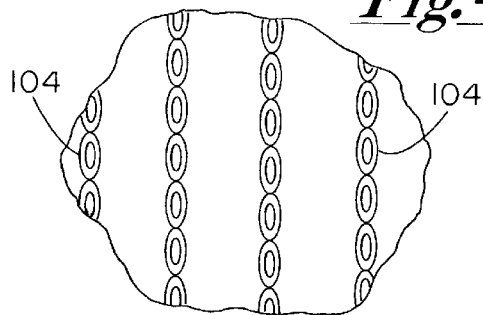
FIG. 15 illustrates an alternative pattern of texturing features.

A variety of alternative patterns can be used to realize the above advantages, so long as the individual texturing features are properly aligned. FIG. 15 shows an alternative pattern in which the location between consecutive features 104 is substantially reduced. Adjacent rims are connected to one another at their ends, thus to form a substantially continuous spiral track. This can be accomplished either by increasing the laser firing frequency, reducing the angular speed of the substrate disk, or both. More generally, texturing features can be formed in concentric rings rather than spiral, or even distributed somewhat randomly throughout the contact zone, so long as they are aligned with their major axes in the circumferential direction.

Another improvement is the reduction in noise or acoustic energy at transducing head takeoff and landing. For mechanically textured disks, the acoustic energy has been found to be about 100 mV. For disks with contact zones laser textured with circular or axisymmetric texturing features, the acoustic energy is substantially higher, e.g. about 200 mV. By comparison, magnetic disks with landing zones laser textured with elliptical features in end-to-end contact as shown in FIG. 15, exhibit acoustic energy of abut 70 mV at takeoff and landing, a substantial reduction compared to previous laser texturing, and a favorable comparison to mechanical texturing. This significant reduction most likely is due to the more gradual texturing feature height gradients in the direction of head travel, and is likely to allow lower transducing head flying heights over the contact.

Figure 16:
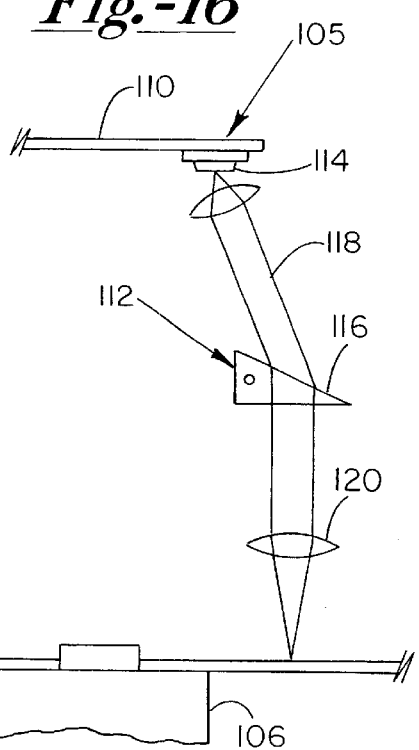
FIG. 16 illustrates an alternative texturing device.

FIG. 16 illustrates and alternative device 105 for forming the texturing features, including a spindle 106 rotatably supporting a substrate 108, a carriage 110 and a laser module 112 moved by the carriage radially of the spindle and substrate. Laser module 112 includes a laser 114 and collimating optics, a single wedged prism 116 for shaping the laser beam 118, and a focusing lens 120. While wedged prism 116 is suitable for expanding the beam in one direction while leaving its direction constant in the other, there is less flexibility in terms of adjusting aspect ratios, since each angular adjustment of prism 116 (e.g. to change the angle of refraction) also changes the direction of the shaped beam exiting the prism.

Figure 17:
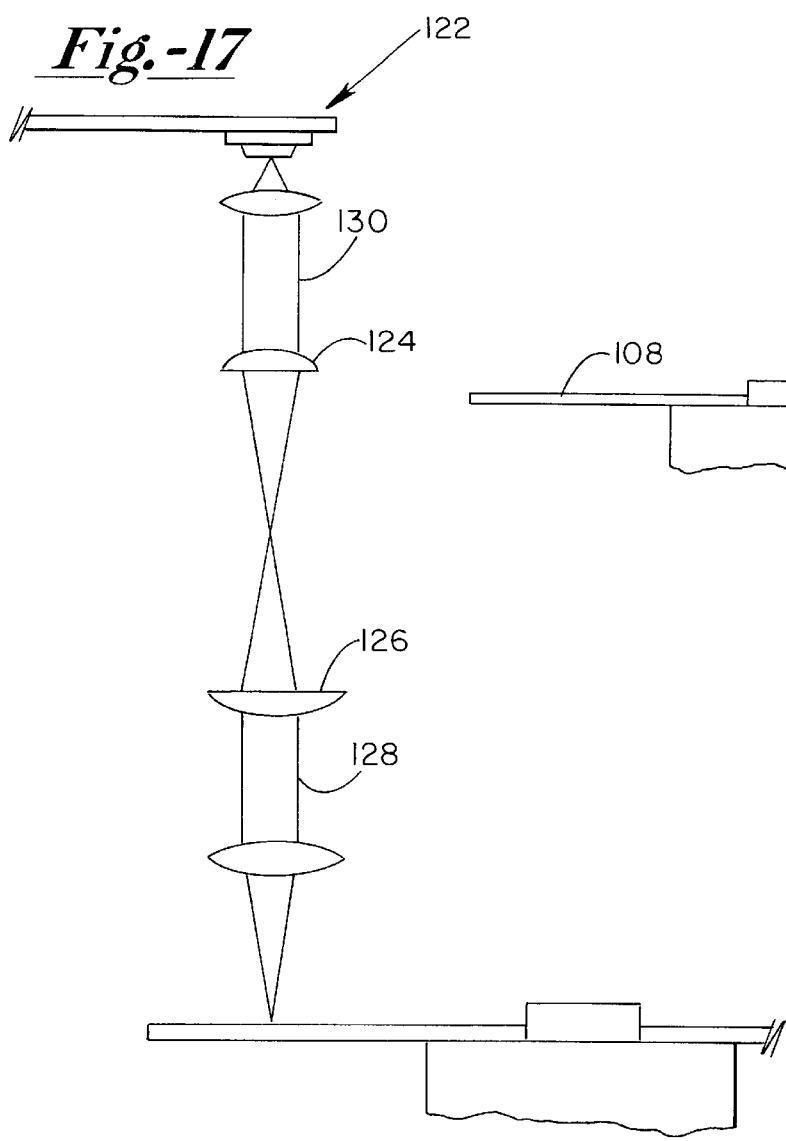
FIG. 17 illustrates a further alternative laser texturing device.

FIG. 17 illustrates a further alternative laser texturing device 122, similar to device 50 with the exception that the beam shaping optics include cylindrical lenses 124 and 126 in lieu of the wedged prisms. Downstream lens 126 has a larger radius of curvature than the upstream lens. The two lenses are centered on a common axis, so that a shaped beam segment 128 not only is parallel to incident beam 130, but also coaxial. While this can be considered an advantage, in most respects device 50 is preferred, due to the need for and difficulty in achieving perfect alignment of the cylindrical lenses in terms of their centers, distance from one another and orientation. Further, lenses 124 and 126 are subject to spherical aberration coma, astigmatism, field curvature, and distortion. Accordingly, it is substantially more difficult in device 122 to preserve collimation and propagation factor $M^2$. Also, because the focal spot is larger than the defraction limit in the case of the cylindrical lenses, certain texturing features are too small to be formed using device 122.

Figure 18:
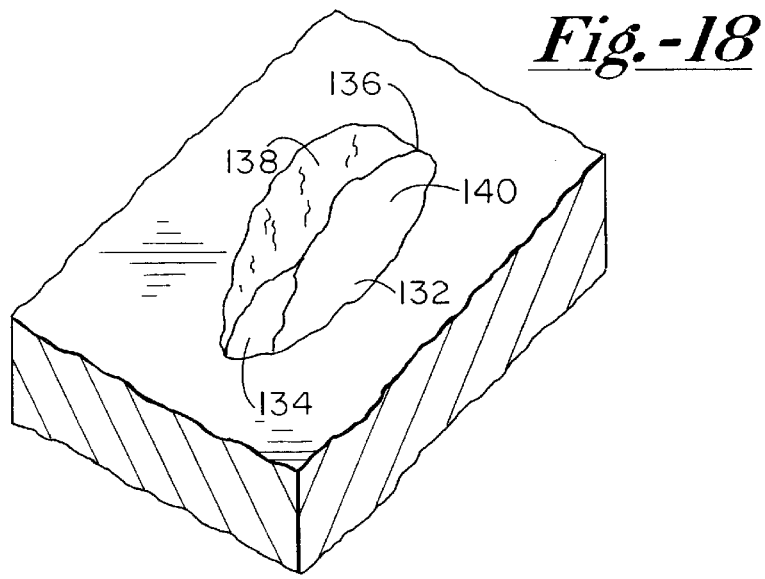
FIG. 18 illustrates a further alternative asymmetric texturing feature.

FIG. 18 illustrates an alternative rim 132 formed for example using device 50. As an extension of the non-uniform height of electrical rims, it has been found that by using a sufficiently large aspect ratio, the rim height at the opposite ends of the ellipse can be made negligible, in effect forming two opposite end gaps 134 and 136 in the rim, or in other words forming two crescent-like sections confronting one another, as indicated at 138 and 140 in FIG. 18.

When properly aligned, rims 132 provide the same advantages as rims 88 discussed above, with a further advantage in that rims 132 are open and considerably less prone to debris entrapment. The reduced tendency to entrap material is likely to enhance wear characteristics.

Figure 19:
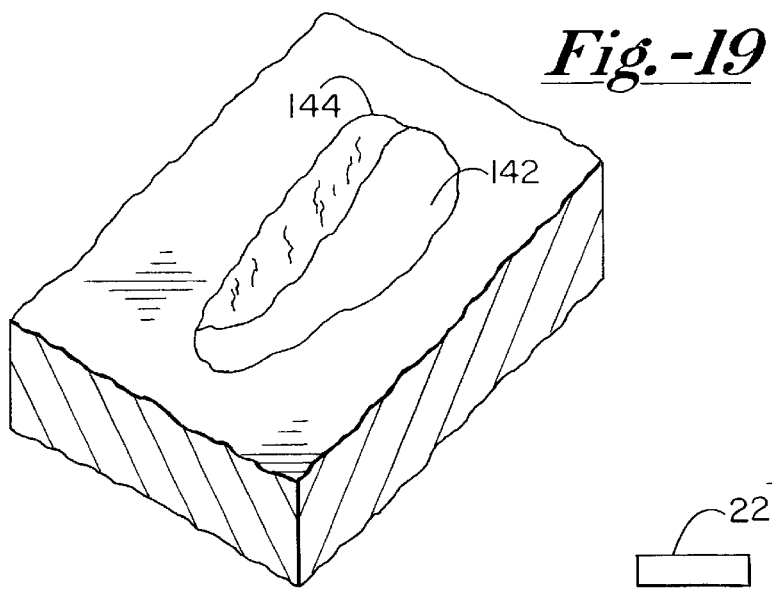
FIG. 19 illustrates yet another alternative asymmetric texturing feature.
Figure 20:
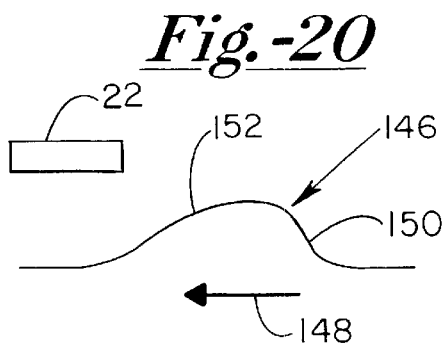
FIG. 20 illustrates a side profile of the feature in FIG. 19.

FIG. 19 illustrates a further alternative texturing feature in the form of an irregular rim 142. As compared to rim 88, the irregular rim has a further asymmetry, in that the maximum height regions 144 are offset from the minor axis rather than centered. FIG. 20 illustrates the rim side profile 146. Beneath the profile, an arrow 148 indicates the circumferential direction of disk rotation, i.e. the opposite to the direction of transducing head "travel". The rim profile exhibits a relatively steep slope 150 and a more gradual slope 152. As before, the major axis of the rim coincides with the circumferential direction. When the disk rotates in the direction shown, the head first encounters the more gradual slope 152. Thus, the benefits achieved by elongating and properly aligning the texturing features are increased by forming an irregular elongated feature, oriented with reference to head and disk movement as shown.

The asymmetry as to slope in rim 142 is achieved by adjusting the alignment and relative orientation between wedged prisms 64 and 66, and focusing lens 84.

Thus in accordance with the present invention, magnetic data storage disks can be textured, particularly throughout dedicated head contact areas, for more controlled accelerations and decelerations of the head, reduced dynamic friction, and improved resistance to wear. These advantages arise due to a process that affords more control over the shape and orientation of elongated, elliptical or otherwise non-axisymmetric texturing features. A high degree of consistency is achieved in forming and aligning asymmetrical features. These features have a uniform orientation determined with reference to the direction of transducing head accelerations and decelerations, to maximize the performance advantages derived from the asymmetries.

What is claimed is:

1. A device for storing magnetic data, including:
a magnetic recording medium including a substrate body formed of a non-magnetizable material and a magnetizable film deposited over the substrate body and substantially uniform in thickness, said magnetic recording medium having a substantially planar surface including a contact region adapted for a surface engagement with a magnetic data transducing head during accelerations and decelerations of the transducing head due to movement of the magnetic recording medium in a predetermined direction relative to the transducing head; and
multiple elongate texturing features formed in the substantially planar surface and protruding above a nominal surface plane of the contact region to collectively define a surface roughness of the contact region, each of the texturing features having a major axis in its length direction and a minor axis in its width direction, and further having a gradient in its height characterized by a maximum height region and first and second top edge regions extending downwardly and oppositely away from the maximum height region substantially in said length direction toward first and second opposite ends of the texturing feature and terminating at said first and second ends, respectively, wherein the texturing features are oriented with their major axes in the predetermined direction, and the first and second ends have substantially the same height.

2. The device of claim 1 wherein:
said magnetic recording medium is a rotatable disk, and the predetermined direction is circumferential with respect to the disk.

3. The device of claim 1 wherein:
the texturing features have heights, above the nominal surface plane in the range of about 5–30 nm.

4. The device of claim 1 wherein:
each of the texturing features has a length of at least 1.1 times its width.

5. The device of claim 4 wherein:
each of the texturing features has a length in the range of 2–6 times its width.

6. The device of claim 1 wherein:
the texturing features include at least one of the features selected from the group consisting of: substantially elliptical rims, and pairs of confronting crescent-like ridges spaced apart from one another to define gaps at opposite ends thereof.

7. The device of claim 1 wherein:
each of the texturing features has an asymmetry in height gradiants in the predetermined direction.

8. The device of claim 7 wherein:
said asymmetry is characterized by the first top edge region being substantially steeper than the second top edge region.

9. The device of claim 8 wherein:
the second top edge region is positioned to encounter a transducing head before the first top edge region when the magnetic recording medium is moved in the predetermined direction relative to the transducing head.

10. The device of claim 1 further including:
a metallic, non-magnetizable underlayer disposed between the substrate body and the magnetizable film, and having a substantially uniform thickness.

11. An apparatus for recording and reading magnetic data including the device of claim 1, and further including:

a magnetic data transducing head;

means for supporting the transducing head in a selected orientation relative to the recording medium for controlled movement relative to the recording medium in a direction substantially perpendicular to the predetermined direction; and means for moving the magnetic recording medium in the predetermined direction.

12. The apparatus of claim 11 wherein:

the magnetic recording medium is a rotatable disk, and the direction for the controlled movement of the transducing head is radial with respect to the disk.

13. The device of claim 1 wherein:

the texturing features are arranged in a spiral pattern.

14. The device of claim 1 wherein:

the first and second ends of each texturing feature substantially coincide with the nominal plane.

15. The device of claim 1 wherein:

the first and second end of each texturing feature are substantially centered on the major axis.

16. The device of claim 1 wherein:

the gradient in height is further characterized by the maximum region and third and fourth top edge regions extending downwardly and oppositely away from the maximum height region in directions substantially perpendicular to the length direction toward opposite sides of the texturing feature, and the third and fourth top edge regions have steeper slopes than the first and second top edge regions.

17. The device of claim 1 wherein:

the texturing features include elongate nodules.

18. A substrate for a data storage medium, including:

the substrate body formed on a non-magnetizable material and having a substantially planar substrate surface, wherein the substrate body is adapted to support a plurality of thin film layers including a magnetizable recording layer, and further is moveable in a predetermined direction relative to a magnetic data transducing head; and multiple elongate texturing features formed in the substrate body and protruding above a nominal surface plane of the substrate surface at least throughout a selected region of the substrate surface, to collectively define a surface roughness of the selected region, each of the texturing features having a major axis in its length direction and a minor axis in its width direction, and further having a gradient in its height characterized by a maximum height region and first and second top edge regions extending downwardly and oppositely away from the maximum height region substantially in said length direction toward first and second opposite ends of the texturing feature and terminating at said first and second ends, respectively, wherein the texturing features are oriented with their major axes in the predetermined direction, and the first and second ends have substantially the same height.

19. A substrate of claim 18 wherein:

the substrate body is disk shaped, and the predetermined direction is circumferential with respect to the substrate body.

20. The substrate of claim 18 wherein:

each of the texturing features has a length at least 1.1 times its width.

21. The substrate of claim 20 wherein:

each of the texturing features has a length in the range of 2–6 times its width.

22. The substrate of claim 18 wherein:

the texturing features include at least one of the features selected from the group consisting of: substantially elliptical rims, and pairs of confronting, crescent-like ridges spaced apart from one another to define gaps at opposite ends thereof.

23. The substrate of claim 18 wherein:

the first top edge region of each of the features is substantially steeper than the second top edge region.

24. The substrate of claim 23 wherein:

the second top edge region is positioned to encounter a transducing head before the first top edge region when the substrate body is moved in the predetermined direction relative to the transducing head.

25. The substrate of claim 18 further including:

a metallic, non-magnetizable underlayer disposed over the substrate surface and having a substantially uniform thickness; and a magnetizable film disposed over the non-magnetizable underlayer and having a substantially uniform thickness, whereby an outer surface of the magnetizable film substantially replicates a topography of the substrate surface.

26. The substrate of claim 18 wherein:

the first and second ends of each texturing feature substantially coincide with the nominal plane.

27. The substrate of claim 18 wherein:

the first and second ends of each texturing feature are substantially centered on the major axis.

28. The substrate of claim 18 wherein:

the gradient in height is further characterized by the maximum region and third and fourth top edge regions extending downwardly and oppositely away from the maximum height region in directions substantially perpendicular to the length direction toward opposite sides of the texturing feature, and the third and fourth top edge regions have steeper slopes than the first and second top edge regions.

29. The substrate of claim 18 wherein:

the texturing features include elongate nodules.

30. A magnetic data storage disk, including:

a rotatable magnetic recording disk including a substrate disk formed of a non-magnetizable material and a magnetizable film deposited over the substrate disk and substantially uniform in thickness, the magnetic recording disk having a substantially planar surface including a contact region adapted for surface engagement with a magnetic data transducing head during accelerations and decelerations of the transducing head due to movement of the magnetic recording disk relative to the transducing head in a circumferential direction; and a means for defining a surface roughness of the contact region, including multiple texturing features elongate in the circumferential direction and protruding above a nominal surface plane of the contact region, each of the features having a first gradient in its height characterized by a maximum height region and first and second slopes extending oppositely away from the maximum height region substantially in the circumferential direction, and a second gradient in its height characterized by the maximum height region and third and fourth slopes extending oppositely away from the maximum height region substantially in the radial direction, wherein the third and fourth slopes are steeper than the first and second slopes.

31. The disk of claim 30 wherein:

the texturing features have heights above said nominal surface plane in the range of about 5–30 nm.

32. The disk of claim 30 wherein:

each of the texturing features has a width in a radial direction with respect to the disk, and has a length in the circumferential direction at least 1.1 times the width.

33. The substrate of claim 32 wherein:

the length of each of the texturing features is in the range of 1–6 times the width.

34. The disk of claim 30 wherein:

the texturing features include at least one of the features selected from the group consisting of: substantially elliptical rims; and pairs of confronting, crescent-like ridges spaced apart from one another to define gaps at opposite ends thereof.

35. The substrate of claim 30 wherein:

the first slope of each of the features is substantially steeper than the second slope.

36. The disk of claim 35 wherein:

the second slope is positioned to encounter a transducing head before the first slope when the magnetic recording disk is moved in the circumferential direction relative to the magnetic data transducing head.

37. The disk of claim 30 further including:

a metallic, non-magnetizable underlayer disposed between the substrate disk and the magnetizable film, and having a substantially uniform thickness.

38. A device for storing magnetic data, including:

a magnetic recording medium including a substrate body formed of a non-magnetizable material and a magnetizable film deposited over the substrate body and substantially uniform in thickness, said magnetic recording medium having a substantially planar surface including a contact region adapted for a surface engagement with a magnetic data transducing head during accelerations and decelerations of the transducing head due to movement of the magnetic recording medium in a predetermined direction relative to the transducing head; and multiple elongate texturing features formed in the substantially planar surface and protruding above a nominal surface plane of the contact region to collectively define a surface roughness of the contact region, each of the texturing features having a major axis in its length direction and a minor axis in its width direction, and further having a gradient in its height characterized by a maximum height region and first and second slopes extending downwardly and oppositely away from the maximum height region in directions substantially in said length direction toward first and second opposite ends of the texturing feature, said gradient in height being further characterized by the maximum region and third and fourth slopes extending downwardly and oppositely away from the maximum height region in directions substantially perpendicular to the length direction toward opposite sides of the texturing feature, wherein the texturing features are oriented with their major axes in the predetermined direction, and wherein the third and fourth slopes are steeper than the first and second slopes.

39. The device of claim 38 wherein:

the first and second slopes terminate at the first and second opposite ends, respectively, and the first and second ends have substantially the same height.

40. The device of claim 38 wherein:

the first and second ends of each texturing feature substantially coincide with the nominal plane.

41. The device of claim 38 wherein:

the first and second ends of each texturing features are substantially centered on the major axis.

42. The device of claim 38 wherein:

said magnetic recording medium is a rotatable disk, and the predetermined direction is circumferential.

43. The device of claim 42 wherein:

the texturing features are arranged in a spiral pattern.

44. The device of claim 38 wherein:

the texturing features include at least one of the features selected from th group consisting of: substantially elliptical rims, and pairs of confronting crescent-like ridges spaced apart from one another to define gaps at opposite ends thereof.

45. The device of claim 38 wherein:

the second slope is more gradual than the first slope, and is positioned to encounter a transducing head before the first slope when the magnetic recording medium is moved in the predetermined direction relative to the transducing head.

46. The device of claim 38 further including:

a metallic, non-magnetizable underlayer disposed between the substrate body and the magnetizable film, and having a substantially uniform thickness.

* * * * *